United States Patent Office.

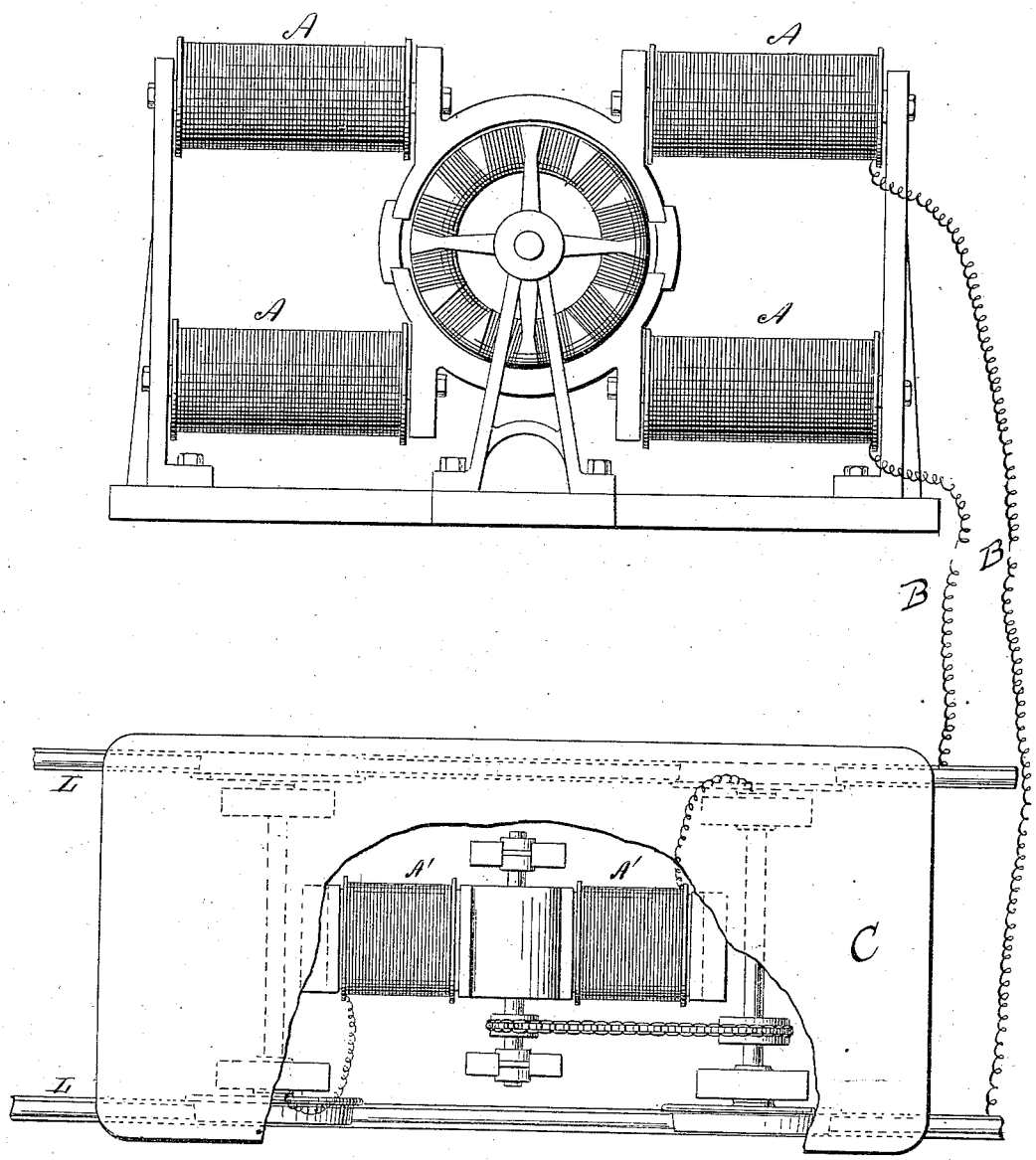

LEO DAFT, OF GREENVILLE, NEW JERSEY.

ELECTRIC RAILWAY.

SPECIFICATION forming part of Letters Patent No. 312,557, dated February 17, 1885.

Application filed April 2, 1883. (No model.)

*To all whom it may concern:*

Be it known that I, LEO DAFT, a subject of the Queen of Great Britain, and a resident of Greenville, New Jersey, have invented a new and useful Improvement in Electric Railways, of which the following is a full, true, and exact description, reference being had to the accompanying drawings.

My invention relates to transmitting power especially for the propulsion of moving engines upon tracks by electricity; and it consists in transmitting the power over conductors not necessarily highly insulated by means of a current of electricity of such low tension that the escape from the conductors occasions a comparatively small loss, while at the same time the conductors are not necessarily protected from accidental contact with animals or human beings, which has heretofore in many cases been necessary.

In practice, in order to supply the electricity to the conductors, I prefer to utilize a machine which generates an electric current having a tension not greater than thirty volts, although this tension may be exceeded without departing from the principle of my invention. Substantially duplicate machines are used for the generation and reconversion of the electricity, although their resistances are made slightly different.

In practice I use the rails upon which the locomotive-engine is to run to carry the electricity to the motor on the engine.

My invention will be readily understood from the accompanying drawing, which shows a general view of the arrangement of the generator and motor, in which A is the generator, B the connections from the generator to the conductors or rails L, and A' the motor on the car C, which runs upon the conductors L.

The generator or generators may be of any well-known construction, the principal requisite being that they shall produce a current of great quantity or body and of low tension. I have shown a generator of a well-known type, having the field-coils and the armature wound with large conductors of low resistance. I prefer, however, to use a specific machine which I have invented, but which forms the subject-matter of a separate application, and is not described herein. I prefer to use a machine the current of which does not exceed thirty volts and the armature of which has a resistance measured from diametrically-opposite sections of not more than five-tenths of an ohm. The motor or motors are similarly constructed, and have about the same internal resistance as the generators.

In the drawing I have shown the generator or generators as connected to the rails, and the motor runs upon the rails, receiving current therefrom. The rails do not require any special means to insulate them other than is materially afforded by the ordinary ties.

I have not deemed it necessary to describe specifically the details of construction and connections of the machine, as those are well understood by persons skilled in the art.

I do not herein broadly claim propelling cars having electric motors thereon by means of currents generated at a station and transmitted to the motors by the rails, as I am aware that it is not new; but as far as I am aware all attempts to so operate the motors upon the cars have been by means of comparatively high-tension currents, necessitating peculiar appliances to partially, at least, insulate the rails or conductors. All such arrangements are expensive to construct, wasteful of the current, and liable to produce injurious effects upon animals or persons coming in contact with the conductors.

I claim—

The combination, in an electric-railway system, of a stationary dynamo adapted to generate currents of low tension, conducting-rails for such currents practically non-insulated, and cars provided with electric motors constructed to make electrical contact with said conductors and to be operated under currents of low tension.

LEO DAFT.

Witnesses:
ANTHONY GREF,
GEO. W. MOTT.